Dec. 18, 1962  T. B. HANSSEN  3,069,524
ELECTRO-RESPONSIVE HEATING SYSTEM
Filed Nov. 12, 1958  3 Sheets-Sheet 1

INVENTOR.
Tore B. Hanssen
BY
Harness, Dickey & Pierce
ATTORNEYS.

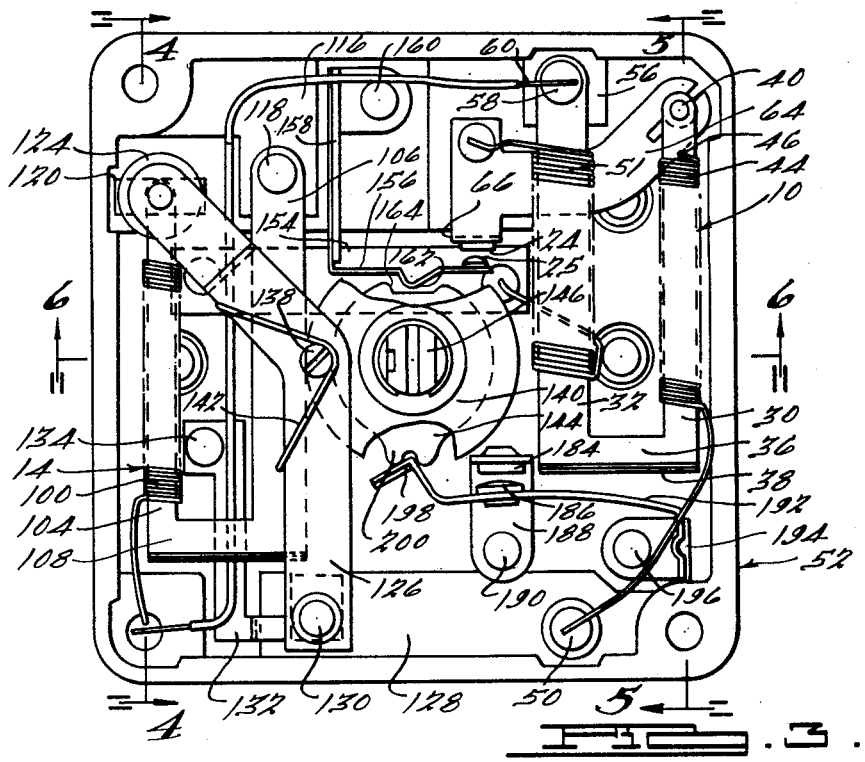
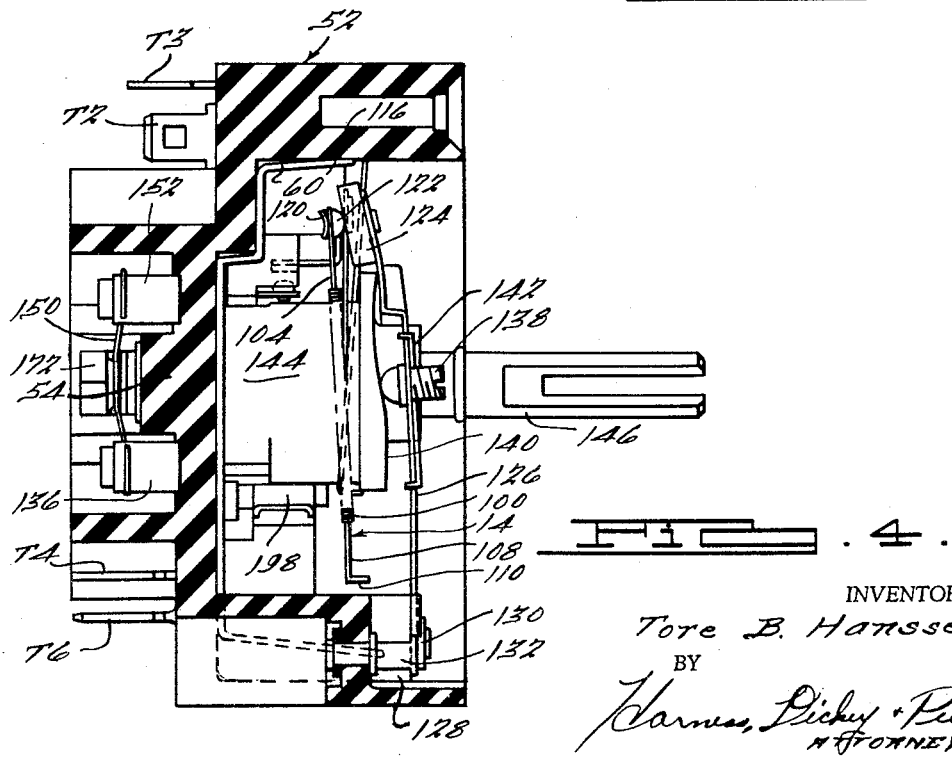

Dec. 18, 1962    T. B. HANSSEN    3,069,524
ELECTRO-RESPONSIVE HEATING SYSTEM
Filed Nov. 12, 1958    3 Sheets-Sheet 3
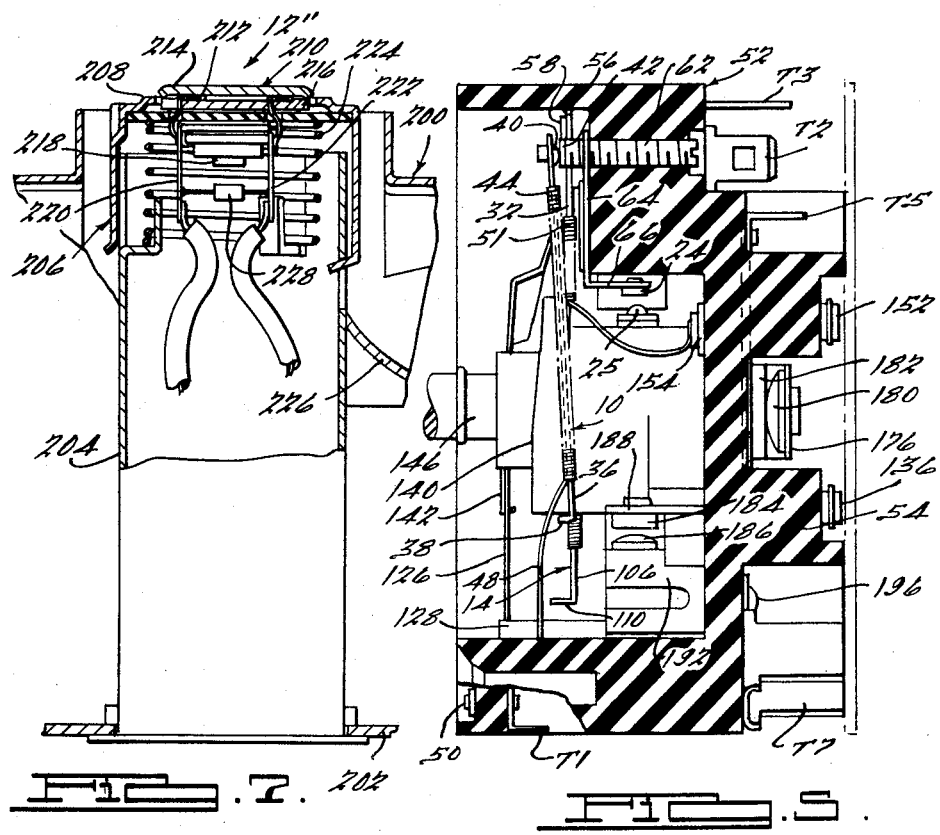
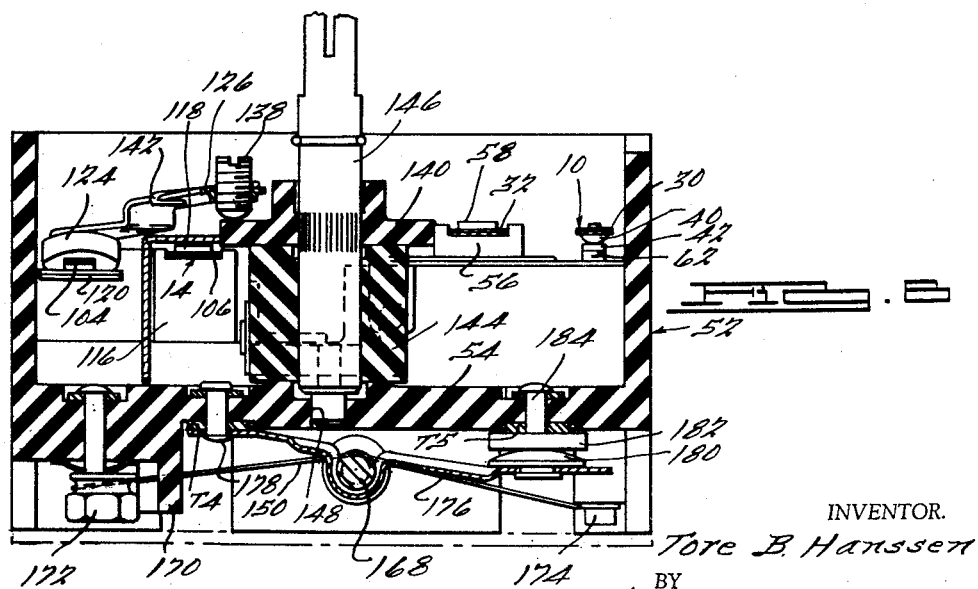
INVENTOR.
Tore B. Hanssen
BY
Harness, Dickey & Pierce
ATTORNEYS.

United States Patent Office 3,069,524
Patented Dec. 18, 1962

3,069,524
ELECTRO-RESPONSIVE HEATING SYSTEM
Tore B. Hanssen, Ann Arbor, Mich., assignor to King-Seeley Thermos Co., a corporation of Michigan
Filed Nov. 12, 1958, Ser. No. 773,286
31 Claims. (Cl. 219—20)

This invention relates to temperature controlling systems and more particularly to apparatus for controlling the operation of a heater in accordance with the sensed temperature of a body.

This invention is an improvement upon the systems disclosed in the United States patent application of George B. Whinery, Serial No. 604,867, filed August 20, 1956, now Patent No. 3,005,896, issued October 24, 1961 and in the United States patent application of Harry I. Baker, Serial No. 773,263, filed on November 12, 1958, now Patent No. 2,962,575 issued November 29, 1960 and the disclosures of those patent applications are incorporated herein by reference.

The principles of the present invention are embodied in a system for controlling the operation of a heater disposed in heat transfer relationship with a body of air such as the air in an oven or a building, in heat transfer relationship with a container body such as a pan disposed in heat transfer relation with the surface heating element on a stove, or in heat transfer relationship with a body to be cooked, melted or cured such as meat in an oven, food in a pan on the stove, or chemical materials being processed.

In general, the energization of the heater is controlled in accordance with the temperature of the body as determined by a sensing element disposed in heat transfer relation with a body, normally the body being heated, with that sensing element preferably taking the form of a resistor having a high temperature coefficient of resistance.

In the preferred arrangement, the variable-resistance senser is utilized to vary the effective output voltage of a self-interrupting or pulsing thermal relay in accordance with the sensed temperature of the body. The pulsing relay is normally arranged to deliver output energy as a series or succession of pulsations the effective voltage of which is substantially independent of variations in the voltage of the source of electrical energy for the control system. The output energy from the pulsing relay is applied to a control or responder relay which, in the illustrated embodiment, responds only to the effective value of the applied voltage rather than to the individual pulsations. The responder relay in turn controls an output relay which controls the energization of the heater.

In accordance with certain of the principles of the present invention, the control or responder relay exerts a feedback control upon the effective value of the output voltage of the pulsing relay reflecting the instant condition of the contacts of the responder relay and, in accordance with one feature of the invention, this feedback control serves to establish in the system the capability of compensating for the effect of source voltage variations upon the operation of the heater.

In general, the responder relay comprises a pair of matable electrical contacts having opened and closed states, and actuating means including a winding for controlling those contacts. The actuating means is effective when a voltage is applied across the winding having a magnitude greater than a first selected value for changing the contacts to one of those states, such as to the open state, and is effective when a voltage is applied across the winding having a magnitude less than a second selected value for changing those contacts to the other one of these states, as to the closed state. Those first and second selected values may be the same or substantially the same, that is, the differences between the voltage magnitudes which produce operation and release of the relay may be zero or substantially zero. However, in the disclosed embodiment of the invention, snap acting means are associated with the relay contacts to cause those selected values to differ from one another.

The magnitude of the voltage which is applied across the winding of the responder relay is controlled by means including the temperature sensing device. In the disclosed arrangements, the electrical contacts of the responder relay cooperate with that means to cause the voltage which is applied across the winding to vary repetitively between first and second magnitudes. At least one of those voltage magnitudes is controlled by the temperature sensing device and is varied in accordance with sensed temperature. In the disclosed arrangement, both of those voltage magnitudes are varied in accordance with sensed temperature.

The changes in the voltage applied to the winding of the responder relay in response to the closure of the responder relay contacts is preferably in a direction to tend to produce a change of state of the responder contacts in the opposite direction and in the preferred arrangement that change in magnitude is sufficient in and of itself and independently of changes in the sensed temperature to produce a change of the state of the responder contacts so that once the set temperature is reached the responder relay repetitively and pulsatingly operates even during periods in which the sensed temperature does not detectably change.

In the preferred arrangement, the responder relay is a thermal relay including a polymetallic element and a heater winding. As a result, due to the time lag of operation of the device, an abrupt change in the voltage applied across the heater winding would not instantaneously produce a corresponding change of the relative position or state of the electrical contacts but rather a delay period or interval will occur. In response to a change in the applied voltage across the heater winding, the polymetallic element tends to heat or cool exponentially and as a result the duration of the delay interval can be varied by varying the magnitudes of the applied voltage. This capability is employed to permit control by the temperature senser, that senser controlling the magnitude of the voltage which is applied across the winding to initiate and control the length of the delay interval. In the disclosed embodiment, both the magnitude of the voltage which produces contact opening movement and the magnitude of the voltage which produces contact closing movement are controlled by the senser so that the durations of both the opening and closing delay intervals are controlled in accordance with sensed temperature.

In the illustrated arrangement, the responder relay is supplied with voltage through a voltage regulating relay comprising a generally U-shaped polymetallic element anchored at the tip of one leg and carrying an electrical contact at the tip of the other leg, with the self-interrupted or pulsing winding being disposed in heat transfer relationship with one of those legs. The above-noted pulsing operation is accomplished by applying an additional heater winding to that polymetallic element, the additional heater winding being placed in heat transfer relation with the other one of the two legs in the illustrated embodiment. This additional winding is energized and deenergized under the control of the electrical contacts on the responder relay. The effect of the energization and deenergization is to produce the above-noted change of the output voltage of the voltage regulating relay between first and second finite magnitudes. However, the output voltage of the regulator will not instantaneously change upon the energization or the deenergization of the additional heater winding but again, since a thermal lag is involved, a delay interval will be entailed between the change of state of the responder contacts and the resultant change in output voltage of the voltage regulating relay. This delay period has proved to be significantly advantageous in establishing a satisfactory relationship between the time delay in the feedback loop relative to the thermal lag of the main heating system loop, in permitting the temperature sensing device to control the on/off ratio of the energization of the responder relay and hence of the main heater, and in permitting adjustment of the sensitivity of the feedback loop in accordance with the sensitivity of the senser.

As another feature of the present invention, the voltage which is applied across the winding of the responder relay under the control of the temperature sensing element is regulated by the voltage regulating device and hence tends to have an average value which is substantially independent of supply voltage variations. However, it has been found to be advantageous to supply the additional heater on the voltage regulating means directly from the supply voltage so that the energization of that additional winding does vary in accordance with supply voltage variations. This has been found to produce system compensation for supply voltage variations, that is, the durations of the energized and deenergized periods of the main heater are appropriately adjusted to compensate for the change in wattage of the heater during its energized periods resulting from the changes of the supply voltage. This capability is achieved, in part, for the reason that the output wattage of the main heater varies as a square of the suupply voltage, during the energized periods thereof, and the wattage output of the additional heater winding upon the voltage regulating relay also varies as a square of the supply voltage. In the illustrated arrangement, the relationships are such that the additional heater winding upon the regulating relay is effective during the periods of energization of the main heater and is deenergized during the periods of deenergization of the main heater. Therefore, the magnitude of the voltage applied across the winding of the responder relay during the periods of energization of the main heater tends to vary both in accordance with sensed temperature and in accordance with variations of the supply voltage whereas the magnitude of the voltage applied across the winding of the responder relay during the deenergized period of the main heater tends to vary solely with the sensed temperature and to be insensitive to variations of the line voltage. It will be recognized that to the extent that the condition of the thermal relay, at any instant, is affected by the condition of that relay at an earlier instant, that is, to the extent that the thermal relay has a memory, there may be some supply voltage variation effect upon the voltage applied across the responder relay winding during the periods in which the main heater is deenergized.

Means are provided for adjusting the equipment to permit varying degrees of energization of the main heater at any given sensed temperature. In one embodiment of the invention, this takes the form of a camming mechanism for physically changing the relative position of the responder contacts. In an alternative arrangement, a plurality of resistors are selectively connected between the source of the temperature-controlled voltage and the energizing winding of the responder relay to vary, in selected increments, the magnitude of the voltage applied across that energizing winding. This adjusting arrangement has the particular merit that it permits the average power supplied to the responder to be substantially constant at all adjustments.

In the illustrated constructed embodiment of the invention, the responder relay and the voltage regulating relay both include a generally U-shaped polymetallic element including an anchored leg and an electrical contact carrying leg. Both of these relays are mounted within a casing having two side walls. Advantageous results in terms of ambient temperature compensation have been found to accrue if those two polymetallic elements are mounted so that corresponding legs of the two elements are adjacent the respective ones of the casing walls so that both relays are subjected to substantially identical radiation effects. In the illustrated arrangement, this is accomplished by forming the two polymetallic elements as mirror images of one another.

The principles of the invention can be incorporated in a system for controlling the temperature of a container or pan disposed in heat transfer relationship with a surface element of a stove. In that event, the temperature senser, which includes a tubular casing, is disposed centrally of the surface element with one of its ends in a position to physically engage the pan or container. The temperature responsive resistor is supported at that end of the casing and hence in intimate heat transfer relationship with the container. To compensate for excessive direct heating of that resistor by the surface element, it is contemplated that a second temperature responsive resistor be disposed within the casing. This resistor is not in intimate heat transfer relationship with the container or pan but is subject to substantially the same direct heating by the surface element as is the primary sensing resistor. In the illustrated arrangement, these two resistors have opposite temperature coefficients of resistance and are employed conjointly to control the output voltage of the voltage regulator. Preferably, the second resistor has a value which, under normal operating conditions, is quite high relative to the value of the primary sensing resistor and hence produces no effect upon the operation of the equipment. However, when there is excessive direct heating of the temperature sensing unit by the surface element, the auxiliary temperature sensing resistor becomes effective to significantly modify the total senser resistance and hence to modify the operation of the equipment.

While the temperature sensing resistor has been illustrated as being connected in series with the heater winding of the voltage regulating relay to control the output voltage of that relay, it will be appreciated that certain of the principles of the present invention can equally well be practiced if the temperature sensing resistor is alternatively connected in series between the voltage regulating relay and the winding of the responder relay. In both cases, the effective output voltage as applied across the winding of the responder relay is varied in accordance with the sensed temperature.

The principles, objects and features of the invention will best be perceived from the following detailed description of embodiments of the invention when read with reference to the accompanying drawings in which:

FIG. 3 is a front elevational view of a structure including certain of the elements of FIGS. 1 and 2, with the cover removed to expose the components;

FIG. 4 is a sectional view taken substantially along the line 4—4 of FIG. 3;

FIG. 5 is a sectional view taken substantially along the line 5—5 of FIG. 3;

FIG. 6 is a sectional view taken substantially along the line 6—6 of FIG. 3; and FIG. 7 is a sectional view of one form of senser suitable for use in the system of FIG. 1 or 2 and embodying certain of the principles of the present invention.

Figure 1:
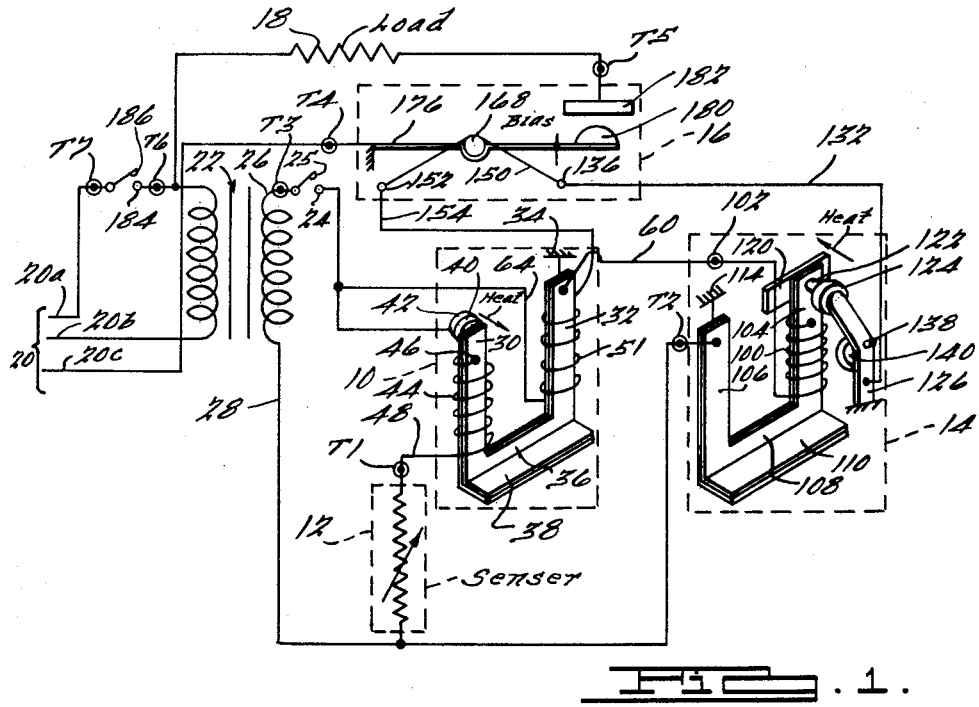
FIGURE 1 is a schematic representation of a temperature controlling system embodying certain of the principles of the present invention.

The system disclosed in FIG. 1 of the drawings comprises a pulser 10 controlled by a senser 12 and controlling a responder 14 which controls an output relay 16 to control the energization of a load 18 from a source of energy 20, the control system also being energized from the source 20 through a transformer 22.

The senser 12 is preferably a resistor (or a plurality of resistors) having a high temperature coefficient of resistance and disposed in heat transfer relationship with a body. Senser 12 may be constructed of wire and have a high positive temperature coefficient of resistance or may be, for example, a ceramic thermistor element having a high negative temperature coefficient of resistance, it being assumed in the illustrated arrangement that a senser having a high positive temperature coefficient of resistance is employed.

Intimate heat transfer relationship between the senser 12 and the body the temperature of which is being sensed may be established in any appropriate fashion. For example, the senser may be disposed within a probe for insertion in meat in an oven or in food being cooked in a pan; it may be disposed in a room or in an oven for sensing the temperature of the air; or it may be disposed at the center of a surface heating element in a stove to sense the temperature of the bottom of a pan disposed upon the surface element. An example of a senser unit for the latter purpose and suitable for utilization as an element of the subject system is disclosed in the United States patent application of E. E. Sivacek, Serial No. 604,917, filed August 20, 1956, now Patent No. 2,980,875, issued April 18, 1961, and the disclosure of that application is incorporated herein by reference.

The load 18 is herein assumed to be a heating element of the electrical resistance type. Heater 18 will normally, but not necessarily, be disposed in heat transfer relationship with the same body the temperature of which is being sensed by senser 12.

The source 20 which supplies the electrical energy for the control system may be, for example, a line source of alternating voltage such as is found in the home and is representatively illustrated as a three-line source, with a nominal 115-volt alternating potential existing between lines 20a and 20b (the neutral) and with a nominal 230-volt alternating potential existing between conductors 20a and 20c. As is well known, the line voltage is subject to substantial variation and accordingly, one of the functions of pulsing device 10 is to prevent such variations of line voltage from adversely affecting the consistency of operation of the control equipment. An alternating current is supplied through the primary winding of step-down transformer 22 from line 20a, terminal T7, switch contacts 184 and 186, terminal T6, and through the primary to line 20b, so that a reduced-magnitude voltage appears across the secondary winding of that transformer and hence between conductors 26 and 28. This voltage is applied through the senser 12 to the electrothermal voltage regulating device 10, one function of which is to receive the noticeably variable voltage between conductors 26 and 28 and to deliver pulsating energy to the device 14 having an effective value which is substantially independent of the variations in the voltage of the source except for an intentional voltage-variation sensitivity to be described hereinafter.

Basically, device 10 can be characterized as including a thermally responsive member at least a portion of which tends to move as a consequence of changes in the temperature thereof. Current modulating means, comprising a pair of electrical contacts in the illustrated arrangement, are associated with this member so as to respond to that tendency to move. The current modulating means serve to increase the heat energy supplied to the thermally responsive member in response to decreases in temperature thereof, and vice versa. Consequently, throughout at least a predetermined range of voltages of the source, the current modulating means periodically increase and decrease the energy supplied to the thermally responsive member and tend to cause it to be maintained at a substantially uniform average temperature for any given resistance or senser 12. On this basis, it will be appreciated that the thermally responsive member receives energy, in pulsating form, at a rate which tends to remain constant despite variations in the line voltage. Consequently, device 10 tends to produce an output voltage in the form of a series or succession of energy pulsations having an effective voltage (a voltage producing the same heating effect in a resistive load as a direct voltage of that same value) which is substantially independent of variations in the source voltage. Further information as to the design and theory of operation of units of this type will be found in United States Patent 2,835,885 granted May 20, 1958 to L. Boddy.

In accordance with certain of the principles of the present invention, the operation of the basic device 10 is intermittently modified to cause the effective value of the pulsating output voltage intermittently to change between lower and higher values, the frequency of this change being low relative to the pulsation frequency. As will be seen, both the lower and the higher effective voltage values are controlled by the sensed temperature and further, in the preferred arrangement, the magnitude of one of these values is also subject to variation with variations in the line voltage.

Figure 2:
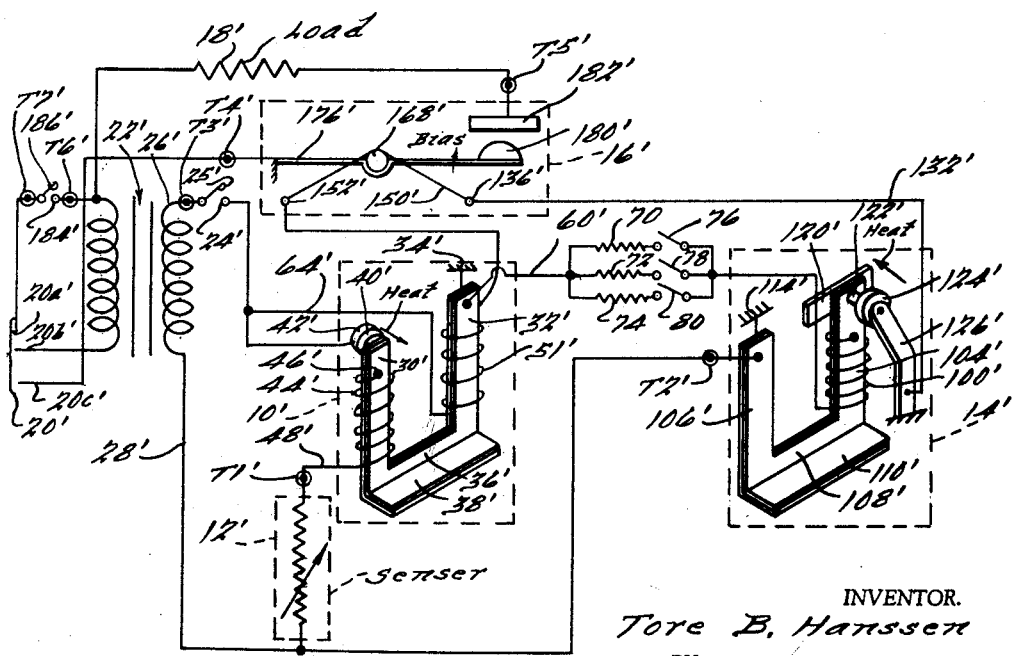
FIG. 2 is a schematic representation of a modified temperature controlling system embodying certain of the principles of the invention.

As may best be seen in the diagrammatic illustrations of FIGS. 1 and 2 and in the structural illustrations of FIGS. 3 and 5, device 10 comprises a polymetallic (representatively bimetallic) thermo-responsive unit including a pair of leg portions 30 and 32 representatively illustrated as lying substantially in a common plane and extending in spaced parallelism with one another in that plane. One end of leg portion 32 is anchored or fixed, as is indicated in FIG. 1 by the earthing symbol 34 (which does not connote electrical grounding) and the other end of leg portion 32 is joined to one end of leg portion 30 by means of a crosspiece 36. An upstanding flange 38 is provided to increase the stiffness of crosspiece 36 to the point where that crosspiece will not deflect to any significant degree in response to the mechanical or thermal forces to which the unit is subjected.

The other end of leg portion 30 carries an electrical contact 40, that contact being electrically as well as mechanically integral with leg portion 30. Contact 40 is adapted to cooperate with a fixed or adjustably fixed contact 42, and the unit is constructed so that those contacs are in firm engagement with one another when the temperature differential between leg portions 30 and 32 is zero or substantially zero. It will be appreciated that the provision of a U-shape member of the nature shown will permit compensation for ambient temperature variations since the effect upon the position of contact 40 of heating of leg portion 30 is the opposite of that produced by heating of leg portion 32.

Differential heating of leg portions 30 and 32 is accomplished by heating means in the form of a heater winding 44 representatively disposed in heat transfer relationship with the leg portion 30, and, more particularly, coiled around that leg portion, and by heating means in the form of a heater winding 51 representatively disposed in heat transfer relation with and coiled around leg portion 32. One end of heater winding 44 is electrically connected to leg portion 30 as at 46, and the other end of that winding is connected to conductor 48 which extends to a terminal T1. Terminal T1 is connected to one terminal of the senser 12 and the other terminal of that senser is connected to conductor 28.

The fixed or adjustably fixed contact 42 is connected to conductor 26 when the switch contacts 24 and 25 are closed. As a result, with contacts 40—42 initially closed, heater winding 44 is connected in series with senser 12 across the secondary winding of transformer 22 so that current flows through contacts 42 and 40, through the heater winding 44, and through senser 12. The resultant heating of leg portion 30 causes the contact-carrying end of that portion to deflect in a direction to separate contact 40 from contact 42. When the contacts 40 and 42 are separated, the energizing circuit for heater winding 44 is interrupted, and leg portion 30 commences to cool, deflecting in a direction to bring contact 40 into re-engagement with contact 42 to re-establish the initial conditions. Leg portion 30 continues to deflect in alternate directions with a small-amplitude motion, tending to maintain the effective wattage input (for any given resistance of senser 12) to the heater winding 44 constant. As a result, the heater winding 44 will receive energy as a series of pulsations the average or effective value of which does not vary (except for an intentional variation hereinafter to be described) with variations in the magnitude of the voltage of source 10, and a pulsating voltage will appear between leg 30 (and parts electrically integral therewith) and conductor 28.

In the structural views, illustrating a preferred construction, the unit 10 is mounted within a generally cup-shaped insulating casing 52 having a base 54. The end of leg portion 32 of the polymetallic thermo-responsive element (best seen in FIGS. 3 and 5) is anchored upon a boss 56 formed integrally with the casing 52 by means of a rivet 58 which also serves, in the illustrated arrangement, as a terminal by means of which conductor 60 is made electrically integral with the polymetallic element. One end of heater 44 is connected to that element, and the other end is connected to rivet 50 which also secures the terminal T1 (FIG. 5) to the casing 52. The contact 42, cooperating with active contacts 40 mounted on the free end of leg portion 30, is secured upon a screw 62 (FIG. 5) which is threaded into the casing 52 and the head of which is accessible from the rear of that casing to adjust the position of contact 42. Screw 62 is embraced by the bifurcated end of a connector 64 which is provided with a depending portion 66 carrying contact 24 which is matable with contact 25 in a manner to be described hereinafter.

For any given adjustment of screw 42, the device 10 tends to maintain the contacts 40 and 42 in a condition of incipient opening and closing with the tempearture of the polymetallic leg portion 30 undulating about that temperature at which contacts 40 and 42 just close. With relatively fixed radiating conditions, this connotes that the heat output or wattage of the winding 44 will have a constant effective value (except for variations to be described) over a period of time even though during that period the heater is energized and deenergized repetitively at the rate of opening and closing of the contacts 40—42. Since the resistance of wire 44 is fixed, the square of the effective current and hence the effective current will also tend to be constant. The effective voltage appearing between polymetallic element 30 and conductor 28 and hence between output conductor 60 and conductor 28 equals (except for periodic modification to be described) the sum of a fixed voltage drop across heater 44 and a variable voltage drop across sensor 12, the former being determined by the product of the fixed effective current and of the fixed resistance of heater 44 and the latter being determined by the product of the fixed current and the variable resistance of senser 12. Therefore, the means including contacts 40 and 42, sensor 12, and heater winding 44 tends to maintain the effective output voltage from device 10 constant despite changes in the voltage of source 20, but causes that voltage to vary directly with the resistance of senser 12. This output voltage appears between conductors 60 and 28.

The resistance of senser 12, the resistance of heater 44 and the position of contact 42 can be adjusted to meet varying system requirements. In a preferred arrangement, heater winding 44 had a resistance of 14 ohms, and the resistance of senser 12 varied from about 10 ohms at room temperature to about 20 ohms at 450° F. It will be observed that the wattage dissipated by sensor 12 at high sensed temperatures is greater than the wattage dissipated at low sensed temperatures in accordance with the change of resistance of the positive temperature coefficient of resistance senser and that this action tends to produce a self-amplifying effect, the increased self-heating at higher temperatures producing the effect of a higher resistance, thereby providing an amplified indication of the magnitude of the increase in sensed temperature. This effect can be magnified or minimized by selection of the magnitude of the current in the sensor so as to adjust the relative magnitudes of the sensor heating due to heat transfer with the body being sensed and the senser heating resulting from the passage of current therethrough.

While it was assumed in the foregoing discussion that the resistance of heater 44 is constant, it will be recognized that a wire having a positive temperature coefficient of resistance may be employed for that heater to vary the operation of the unit with temperature changes of the heater if desired.

The output voltage appearing between conductors 60 and 28 is applied across heater winding 100 of the responding device 14, one end of wire 60 and one end of heater 100 both being connected to a rivet 102 (FIGS. 3 and 4) and the other end of heater winding 100 being connected to leg portion 104 of a U-shape polymetallic element also including leg portion 106 disposed in spaced parallelism with leg portion 104 and crosspiece 108 which is provided with a flange 110. This polymetallic element is or may be identical to the polymetallic element of the pulsing device 10 with the preferred exception, as best illustrated in FIG. 3 of the drawings, that the two polymetallic elements are reversed from one another left to right (as mirror images) and positioned so that the active leg portion 104 of element 14 is spaced from the wall of the casing 52 by an amount substantially equal to the spacing between the active leg portion 30 of the device 10 and the opposite wall of the casing 52. By virtue of this arrangement, both active leg portions are subjected to substantially identical heat transfer environments and to substantially identical radiation effects. It has been found that the ability of the system to operate consistently despite ambient temperature variations and particularly despite abrupt and major changes in the ambient temperature is substantially improved by virtue of the disclosed arrangement over an arrangement in which both polymetallic elements are of identical shape so that the distance between the active legs thereof and a wall of the casing differs materially. The disposition of the polymetallic elements in the noted positions is not, of course, imperative to the practicing of all of the principles of the invention.

The tip of leg portion 106 is anchored as is represented by the earthing symbol 114 in FIG. 1. In the structural views, it will be seen that the end of leg portion 106 is secured to a boss 116 formed integrally with the casing 52 by means of a rivet 118 which also secures a terminal T2 in position at the back of the casing (FIG. 2). Conductor 28 is connected to leg portion 106 at terminal T2 and hence the entire polymetallic element is at the potential of conductor 28. Therefore, since one end of heater 100, on leg portion 104, is electrically connected to leg portion 104, it is also connected to conductor 28 through leg portion 104, crosspiece 108, and leg portion 106.

An armature 120 and an electrical contact 122 are secured to the free end of leg portion 104, electrical contact 122 being electrically integral with leg portion 104. Contact 122 is matable with an electrical contact 124 which is attached to the free end of an angled spring 126, the other end of which is fixed as by being attached to a boss 128 on the casing 52 by means of a rivet 130 (FIG. 3). A conductor 132 is secured in electrical engagement with spring 126 by means of rivet 130 and extends into electrical engagement, through a rivet 134, with an anchor 136 (FIGS. 2 and 4) which serves as one input connection to the output relay device 16 as will be described.

It is desired, in the preferred arrangement, that the device 14 integrate the relatively frequent pulsations of energy which are applied to it from device 10 as a result of the action of heater 44 so that it will respond only to the effective value of the voltage between conductors 60 and 28 and so that a spread or differential must exist between the effective voltage at which the contacts 122 and 124 will be brought into engagement and the higher voltage at which contacts 122 and 124 will be separated. In the illustrated embodiment, this is accomplished by employing a permanent magnet to produce a snap action of the contacts, the permanent magnet in this case also serving as or carrying centered thereon the contact 124. This magnet cooperates with armature 120 so as to restrain separation of the contacts 122 and 124, those contacts being engaged, as a result of the pretension or bias in the polymetallic element of the device 14, when the leg portions 104 and 106 are at equal temperatures. In response to an increase in the effective voltage appearing across winding 100, leg portion 104 heats, tending to deflect in a direction to separate contact 122 from contact 124. This separation is inhibited by the magnetic action. However, when the effective voltage rises to a sufficient value, the contacts 122 and 124 abruptly separate. If thereafter the effective voltage applied across winding 100 is reduced, the temperature of leg portion 104 is lowered, and contact 122 approaches contact 124. When contact 122 is in a selected degree of proximity to contact 124, the magnetic attraction between permanent magnet 124 and armature 120 produces a rapid movement of the contact 122 into engagement with contact 124.

Basically, except for the modified action produced by circuit means including heater 51, the system tends to act thermostatically, an increase in the temperature sensed by sensor 12 tending to produce (with a positive temperature coefficient of resistance sensor) an increase in the output voltage between conductors 60 and 28 of a sufficient magnitude to produce separation of contacts 122 and 124, and those contacts tending to remain separated until the sensed temperature reduces sufficiently to drop the effective voltage between conductors 60 and 28 to a value such that contact 122 will approach contact 124 sufficiently closely to produce snap closure.

The temperature of leg portion 104 at which the contacts 122 and 124 are separated or closed is adjusted, in the illustrated arrangement, by adjusting the position of contact 124. To this end, a screw 138 is threaded through an aperture at the elbow of the spring 126 and engages the face of a cam 140 (best shown in the structural views) and hence serves as a cam follower to adjust the position of contact 124 in accordance with the rotational position of cam 140. A spring clip 142 clamps upon the spring 126 and frictionally engages the screw 138 to prevent loss of adjustment thereof due, for example, to vibration.

Cam 140, as well as a cam 144, is secured upon a shaft 146 one end of which is rotatably supported in an aperture 148 (FIG. 6) in the bottom 54 of the casing 52 and the other end of which may be guided in an aperture in a cover plate (not shown).

It will be perceived that the position of contact 124 determines the amount of flexure of the polymetallic portion 104 which is required to produce separation of contacts 122 and 124 and hence determines the required magnitude of the effective voltage across winding 100.

The closure of contacts 122 and 124 completes a circuit from one end of the secondary winding of transformer 22, conductor 28, through those contacts, spring 126, connector 132, anchor 136, sag wire 150 of the output relay 16 (which is representatively illustrated as a hot wire relay), anchor 152, connecter 154, winding 51, member 64, contact 24, contact 25, terminal T3, and via conductor 26 to the other end of the secondary winding of transformer 22. As a result, sag wire 150 and winding 51 are both energized.

Contacts 24 and 25 are elements of a switch for controlling the energization of the control system. As previously noted, contact 24 is mounted upon member 64 (FIGS. 3 and 5). Contact 25 is supported upon a spring 156 which is secured to a bracket 158. Bracket 158 is mounted upon the casing 52 by means of a rivet 160 which also connects it to terminal T3 (FIG. 2). Spring 156 has an angularly bent portion 162 (FIG. 3) which in the illustrated "off" rotational position of shaft 146 falls within a recess 164 cut in cam 144 so that the contacts 24 and 25 become separated. As shaft 146 is rotated to place the equipment in operation and to adjust the controlled temperature, cam 144 engages portion 162 of spring 156 to force the contact 25 into engagement with contact 24 and maintain those contacts in engagement in all but the "off" position.

The hot wire relay 16 which is energized upon the closure of contacts 122 and 124 of device 14 is best illustrated in FIGS. 2 and 6 of the drawings. The wire 150 extends from anchor 136, through a slot in actuator 168, around a boss 170 formed integrally with the bottom of the casing 52, back in a parallel course through another slot in actuator 168, into re-engagement with a guide 170, around an adjusting eccentric 172, into re-engagement with guide 170, along a course paralleling the two initial courses and into engagement with a third slot in the actuator 168, around a boss 174 formed integrally with the casing 52, and back along a fourth parallel course and through a fourth slot in actuator 168 and is secured to anchor 152.

As may best be seen in FIG. 6 of the drawings, actuator 168 has a central portion engaging an offset portion of a spring 176 which is anchored to the bottom 54 of the casing 52 and electrically connected to terminal T4 (FIGS. 2 and 4) by means of a rivet 178. A contact 180 is carried at the other end of spring 176 and is matable with a contact 182 which is secured to the bottom 54 of the casing 52 and in electrical engagement with a terminal T5 (FIGS. 2 and 5) by means of a rivet 184.

As is best illustrated in FIG. 6, spring 176 is pretensioned or biased so as to tend to bring contact 180 into engagement with contact 182. However, when the wire 150 is at normal or room temperature, it exerts a force upon the spring 176 through the actuator 168 deflecting the spring so as to separate those electrical contacts, as shown in FIG. 1. When contacts 122 and 124 of device 14 close, the previously traced energizing circuit is completed whereby current flows through wire 150. Wire 150 heats and elongates and permits spring 176 to move contact 180 into engagement with contact 182. Terminal T4, electrically connected to contact 180, is connected to line 20c of the source 20 in the arrangement illustrated in FIG. 1. Terminal T5, associated with fixed contact 182, is connected to one terminal of the load 18. The other terminal of the load 18 is connected via terminal T6, contacts 184 and 186, and terminal T7 to line 20a from the source 20.

Contacts 184 and 186 are closed whenever the shaft 146 (FIGS. 3-6) is turned from its "off" position. As may best be seen in FIG. 3 of the drawings, contact 184 is supported upon a bracket 188 which is secured to the bottom 54 of the casing 52 and in electrical engagement with terminal T6 (FIG. 2) by means of a rivet 190. Contact 186 is carried upon a spring 192 which is anchored to a bracket 194, and bracket 194 is in turn secured to the bottom 54 of the casing 52 and electrically connected to terminal T7 by means of rivet 196. The free end of spring 192 is bent to define a cam follower 198 adapted to cooperate with a notched protuberance 200 upon the cam 144. When shaft 146 is in its "off" position, protuberance 200 moves spring 192 to separate contacts 186 and 184. In all other positions of rotation of shaft 146, contact 186 is in engagement with contact 184 so as to connect the load and the transformer primary winding to the source, as shown in FIG. 1.

The hot wire relay 16 follows the operation of device 14, closure of contacts 122 and 124 of device 14 producing rapid closure of contacts 180 and 182 and opening of contacts 122—124 terminating heating of hot wire 150 and causing contact 180 to be separated from contact 182. Heater 18 is correspondingly energized and deenergized.

In the above noted constructed embodiment of the invention, the resistance of responder winding 100 was selected to be 42 ohms which was found to produce a suitable change in the power supplied to winding 100 with a given change of temperature of the body as sensed by senser 12. It will be recognized that considerable freedom is available in the selection of the resistance of winding 100 since, as distinguished from the arrangement disclosed in the above identified Whinery application, the heat dissipating capabilities of the senser 12 are not controlling of the selection of the resistance of winding 100. The ratio of wattage change in the heater 100 with a given change in the senser resistance is, at least over a range, effectively independent of the value of winding 100, but the present arrangement permits higher absolute values of wattage to be applied to the winding 100 so that the absolute wattage change produced by a given sensed-temperature change can be much larger than was the case in the system disclosed in the Whinery application.

While the polymetallic elements of devices 10 and 14 and 10' and 14' have been illustrated to be U shaped and ambient compensated, the provision of ambient temperature compensation or the achievement of ambient temperature compensation in this particular fashion is not essential to the practice of all of the principles of the present invention.

Since winding 51, disposed in heat transfer relation with polymetallic leg portion 32 of device 10, is connected in circuit with the hot wire 150, heater 51 will be energized each time that contacts 122 and 124 of device 14 are closed and will be deenergized each time that those contacts are opened. Energization of winding 51 results in the generation of heat by that winding serving to elevate the temperature of polymetallic leg portion 32. In response to that elevation of temperature, the end of leg portion 32 which is remote from the anchor and adjacent the crosspiece 36 deflects outwardly from the plane of the paper in the views of FIGS. 1, 2 and 3 of the drawings carrying rigidified crosspiece 36 therewith. As a result, the plane of crosspiece 36 is tilted in a direction to tilt the free end of polymetallic leg portion 30 downwardly from the plane of the paper in FIGS. 1, 2 and 3 and in a direction to move contact 40 toward contact 42. The effect, therefore, is in opposition to the effect of raising the temperature of leg portion 30, and is similar to that which would be produced if the resistance of the heater 44 were increased upon the closure of contacts 122—124.

This reduction in the temperature differential between leg portions 30 and 32 results in an increase in current through the heater winding 44 and the senser 12 since additional wattage has to be dissipated by heater winding 44 to raise the temperature of polymetallic leg portion 30 to the point where the contacts 40 and 42 will again be in a condition of incipient opening and closing. The increased current through the serially interconnected resistance 44 and resistance 12 produces an increased voltage drop between point 46 and conductor 28 and hence between conductors 60 and 28 and as a result an increased voltage is developed across winding 100 of device 14. This increase in voltage results in an increased wattage dissipation by heater 100 and an elevation of the temperature of polymetallic leg portion 104, tending to separate contacts 122 and 124.

While in one mode of operation, the energy pulses supplied to leg 32 can be integrated, in the preferred mode of operation, no such integration occurs, polymetallic leg portion 32 cooling to a substantial degree toward ambient temperature during each period that heater winding 51 is deenergized. As a result, the voltage between conductors 60 and 28 will rise whenever contacts 122 and 124 ar closed and will fall to a value controlled primarily by the instant resistance of senser 12 whenever contacts 122 and 124 are open. However, since polymetallic leg portion 32 will heat and cool exponentially, the voltage between conductors 60 and 28 will rise exponentially following the instant of closure of contacts 122 and 124 and will fall exponentially after those contacts are opened. As a result, a period of time is required after contacts 122 and 124 close before the full resultant voltage rise occurs. This time delay has proved to be of substantial advantage in the operation of the system, and is an important aspect of the present arrangement.

The magnitude of the increase in voltage may be selected, primarily by selecting the resistance value of winding 51, so as to reduce the sensed temperature to which senser 12 must rise before contacts 122 and 124 are opened, it may be selected so that the elevation of temperature of leg portion 104 is just sufficient to separate contacts 122 and 124 so that no change in the sensed temperature is required to produce separation of those contacts, or the voltage may be sufficient to produce a complete separation of the contacts 122 and 124 even though senser 12 has not been subjected to an increase in temperature. Otherwise stated, the voltage increase may be sufficient to partially compensate for the temperature spread or differential established by permanent magnet 124, it may fully compensate for the temperature spread established by that permanent magnet or it may overcompensate. In the latter mode of operation, which is presently preferred, closure of contacts 122 and 124 will produce energization of winding 51 which, after a time delay, will cause the voltage between conductors 60 and 28 to rise to a sufficient value to elevate the temperature of leg portion 104 to the point where contacts 122 and 124 will become separated even though the sensed temperature remains constant. Upon the opening of those contacts, heater 51 is deenergized, and, after a delay period, the voltage between conductors 60 and 28 will fall, polymetallic leg portion 104 will cool, and the contacts 122 and 124 will again close even though the sensed temperature has not been reduced. In this manner, pulsing energization of the load 18 is achieved, the load repetitively being energized and deenergized even though there is no change in sensed temperature.

Since the magnitude of the voltage between conductors 60 and 28 when winding 51 is deenergized is controlled primarily by the value of the senser, and since the magnitude of that voltage when winding 51 is energized is controlled conjointly by the value of the senser and the heat output of the winding 51, both the duration and the frequency of closure of contacts 122 and 124 will be controlled by the sensed temperature. As an example, in the aforementioned constructed arrangement, a heater winding 51 having a resistance of 0.3 ohm was employed. Without the winding 51 in effect, the effective value of the voltage between conductors 60 and 28 changed from 4 volts at the room-temperature senser value of 10 ohms to 6 volts at the high temperature value of 20 ohms. With winding 51 connected, the effective value of the voltage between conductors 60 and 28 repetitively changed between a value determined primarily by the then resistance of senser 12 and a higher value. In the constructed arrangement, the load 18 was energized about once each two minutes when the system was operating to maintain the body at a relatively low selected temperature and about four times per minute when the system was maintaining the body at a relatively high selected temperature. The duration of energization of the heater also varied with the temperature sought to be maintained. For example, in the boil range, the heater was energized about twice per minute and the pulse duration varied, from about 4 seconds to about 9 seconds over the boil range, that is from low boil to high boil.

It will be appreciated that these conditions obtain after the sensed body has reached the set temperature and that during the period in which the sensed temperature is below the selected value, the heater may and normally will be energized fully and continuously until the sensed temperature approaches the set temperature. At that time, the contacts of the hot wire relay 16 will commence to pulse to begin reducing the percentage energization of the heater 18. It is important that this cutting back of the energization of the main heater commence before the sensed temperature reaches the set value for otherwise the thermal lag of the thermal system including the main heater 18 will tend to produce a substantial overshooting of the set value. The auxiliary winding 51 contributes to the prevention of such overshooting since it is fully energized whenever the load 18 is fully energized during initial heating of the body so that the voltage between conductors 60 and 28 is, throughout that period, higher than it would be without the winding 51 and hence it is as if the body being sensed were at a higher temperature than it truly is. As a result, the voltage between those conductors will rise to the point at which contacts 122 and 124 will be separated at a lower sensed temperature than would otherwise be the case.

Another important attribute of heater 51 is in its capability of compensating the entire system including the load 18 for the effects of the line voltage variations, particularly in the boil range. As previously noted, the control system (other than winding 51) is compensated for variations in the voltage of the source 20 by virtue of the regulating action of device 10. However, the wattage output of load 18 will vary with variations in the voltage of source 20. It will be observed, for example, that a 10% reduction in the voltage of the source 20 will produce a 19% reduction in the wattage output of the heater 18 during the energized period; the wattage output of heater 18, during energization, varies exponentially and as the square of the voltage of the source 20.

To provide compensation for this sensitivity to line-voltage variations, heater 51 is energized not from the regulated voltage output of device 10 but rather from the unregulated voltage across the secondary winding of transformer 22. If the voltage of source 20 rises, the wattage output of heater 51 will rise so as to increase the voltage between conductors 60 and 62 and to reduce the time of closure of the contacts 122 and 124. Therefore, while the heater 18 produces a greater heat output during the energized period, each energized period is appropriately reduced in duration so that the average wattage of the heater 18 over a period of times does not vary with variations in the source voltage. This system capability accrues in part from the fact that winding 51 is employed to heat element 32 so that its wattage output also varies as the square of the applied voltage so that the effectiveness of winding 51 to reduce the output pulse time with increase of line voltage and to increase the pulse time with reduction in line voltage is an exponential function matching the exponential characteristics of load 18.

It will be recognized that certain of these principles can also be advantageously applied to an arrangement in which the senser is connected in series between the device 10 and 14.

The modifiaction of FIG. 2 differs from that of FIG. 1 solely in the provided means for setting the unit to the selected temperature or rate of boil, and all elements which are identical to those of FIG. 1 are identified with the same reference characters suffixed by a prime symbol. Similarly, the structural views represent the unit of FIG. 2 except that the cam 140 or screw 138, or both, are deleted.

In the arrangement of FIG. 2 a group of parallel resistors such as resistors 70, 72 and 74 are selectively connected in conductor 60' between device 10' and device 14', resistor 70 being included in series with heater 100' if switch 76 is closed, resistor 72 being connected in series with heater 100' if switch 78 is closed and resistor 74 being connected in series with heater 100' if switch 80 is closed. The resistance values of resistors 70, 72 and 74 differ from one another and are selected to provide the desired set temperatures. Switches 76, 78 and 80 may, for example, be in the form of push buttons with a lockout feature so that the operation of any one of the push buttons will automatically release the others of the push buttons. Resistors may be provided for the whole control range as, for example, in a surface element temperature controller, one or more resistors for the warm range, one or more resistors for the boil range (such as low boil, medium boil, and high boil) and any number of resistors in the fry range. In addition to obviating mechanical errors in the cam 126 of the FIG. 1 system, this arrangement has the merit that it permits the heater winding 100' to operate at a constant power level. In the arrangement of FIG. 1, the power dissipated by heater 100 varies in accordance with the setting or position of contact 124. In the FIG. 2 arrangement, since the power is constant, a relatively high value of power may be employed throughout the range so that it is feasible to reduce the pulse duration and to increase the pulse rate at which the load 18' is energized. This facilitates integration of the energy pulses by the heater 18' and its load, of particular significance with high wattage heater elements.

As above noted, any suitable variable resistance type of sensing unit may be employed for senser 12 or 12', and that senser may be disposed in heat transfer relationship with any type of body in any suitable fashion. If the system of FIG. 1 or FIG. 2 is to be employed to sense the temperature of a pan disposed upon a surface element, with the energization of that surface element being controlled by the herein illustrated equipment, it is preferred that a senser of the type disclosed in the above-identified E. E. Sivacek United States patent application Serial No. 604,917, filed August 20, 1956, now Patent No. 2,980,875, issued April 18, 1961 be employed. The modified senser disclosed in FIG. 7 of the drawings is based upon the disclosure of that patent application and reference may be had thereto for a more complete description of its construction.

The senser 12", which can be substituted or used as the senser 12 of FIG. 1 or the senser 12' of FIG. 2, is designed to be disposed within the central opening of an electrical resistance type of stove surface heating element 200, the senser being supported within that unit by means of an integral mounting plate 202 bolted or otherwise secured to the range or stove structure.

Senser 12" comprises a tubular housing 204 having, at its upper end, a generally tubular cap 206 telescoped thereover. The upper end of the cap 206 is partially closed by a stepped flange 208 defining a central aperture in the cap. A sensing pellet 210 is resiliently supported centrally of the aperture.

Sensing pellet 210 comprises a spiraled resistance wire 212 sandwiched between an arbor head 214 and a backing plate 216, the shank 218 of the arbor passing through an aperture in plate 216. Wire 212 has a substantial positive temperature coefficient of resistance and the unit may have the resistance characteristics hereinbefore mentioned.

The ends of the wire 212 are connected, respectively, to terminal strips 220 and 222 which are insulated from one another by suitable insulating means. One of the terminals 220—222 is connected to terminal T1 or T1' in FIG. 1 or FIG. 2 and the other one of the senser terminals is connected to conductor 28 or 28'.

A spring 224 acts between the housing 204 and the cover 208 to exert a continuing force tending to move the cap and the pellet 210 in an upward direction to a point where the upper surface of the pellet is disposed at or above the plane of the surface element so as to insure intimate heat transfer engagement between the pellet and the pan the temperature of which is being sensed.

The sensing resistance wire 212 desirably assumes the temperature of the bottom of the pan and is insensitive to heating by the surface element except through the pan. However, when an unusually heavy load is placed upon the surface element as, for example, a large pot filled with a substantial quantity of water, the surface element is continuously energized for a relatively long period of time before the pulsing of the output relay contact commences to initiate reduction in the average wattage output of the heater. With that high application of heat for a substantial period, it has been found that the sensing wire tends to receive heat from the surface element, primarily, it is believed, as a result of reflected radiation from members such as the reflector 226 as well as by convection. As a result, under these conditions the senser wire 212 tends ot reach a temperature which is higher than the temperature of the bottom of the pan particularly during the initial heating of hte body to the selected temperature. This tends to produce premature initiation of pulsing of the output relay contacts and premature reduction in the wattage output of the main heater, prolonging the time required to bring the water to boil. Under severe circumstances, the temperature elevation of the senser directly from the surface element may be sufficient to prevent a large quantity of water from being brought to a boil.

In accordance with the improvement here disclosed, a thermistor element 228 having a substantial negative temperature coefficient of resistance is connected in parallel with the sensing wire 212 by connecting the two terminals of the thermistor 228 to terminals 220 and 222, respectively. As a result, the variable resistance representing the senser 12 in FIG. 1 or the senser 12′ in FIG. 2 would, if the device of FIG. 7 is employed, be representative of a variable resistance having two parallel components one of which has a resistance which varies directly with temperature and one of which has a resistance which varies inversely with temperature.

In the preferred arrangement, the resistance of the thermistor or negative temperature coefficient element 228 is substantially greater that the resistance of the positive temperature coefficient of resistance element or, if the available devices do not have this relationship, a fixed, effectively zero temperature coefficient of resistance resistor can be connected in series with the negative temperature coefficient element 222, with that serially interconnected combination being connected in parallel with resistor 212. As the ambient temperature within the housing of the senser 12″ rises, the resistance of wire 212 rises and the resistance of thermistor 228 falls. In normal operation of this system, with light or medium loads, the resistance of thermistor 228 will not be reduced sufficiently to produce any significant effect upon the operation of the equipment. However, if the temperature of the thermistor rises sufficiently as a result of prolonged continuous energization of the heater, connoting a heavy load, the resistance of the thermistor will be reduced to the degree that the total resistance of wire 212 and thermistor 228 will be reduced sufficiently to produce a significant change in the operation of the control equipment. As a result, under these conditions, the output voltage between conductors 60 and 28 or conductors 60′ and 28′ is maintained lower than it would be were thermistor 228 not present and premature opening of the contacts 122—124 or 122′—124′ is prevented, the load is brought as rapidly as possible to boiling condition and is held at the desired rate of boil. Thus, the thermistor serves to reduce the total effective senser resistance by an amount approximating that increase in resistance of senser wire 212 which occurs as a result of direct heating of the wire 212 by the surface element. Otherwise stated, under heavy load conditions, wire 212 tends to rise to a temperature which is higher than the pan temperature, thereby increasing its resistance by a certain increment and the thermistor is designed to act under these conditions to reduce the total resistance by that increment. It will be appreciated that the thermistor can act effectively only in response to prolonged full energization of the surface element since a relatively long time delay or thermal lag exists between the production of heat by the surface element and the elevation of the ambient temperature within the senser housing due to reflected radiation or to convection from the surface element. It is this characteristic which prevents the thermistor from adversely influencing the operation of the system during normal operation but which enables the thermistor to produce a compensatory action under heavy load conditions.

It will also be appreciated that the senser can have a negative temperature coefficient of resistance, that the winding 100 can be disposed on the back leg portion 106, that contacts 122—124 can be normally open and be closed in response to heating of a leg portion of device 14, that contacts 180 and 182 can be normally closed and be opened in response to heating of wire 150, and that other such reversals can be made by correspondingly reversing others of these factors to obtain the proper operation.

Desirably but not necessarily, system ambient temperature compensation is achieved by causing the output of device 10 to vary with changes of ambient temperature in a direction and magnitude to compensate for the changing current requirements of device 14 with the same change of ambient temperature, as taught in L. Boddy Patent 2,835,885.

While it will be apparent that the embodiments of the invention herein disclosed are well calculated to fulfill the objects of the invention, it will be appreciated that the invention is susceptible to modification, variations and change without departing from the proper scope or fair meaning of the subjoined claims.

What is claimed is:

1. In a system for association with a source of energy for controlling a heater in accordance with the sensed temperature of a body, the combination of a pair of matable electrical contacts having opened and closed states, means including said contacts for controlling the heater, actuating means including a winding effective when a voltage is applied across said winding having an effective magnitude greater than a first selected value for changing said contacts to one of said states and effective when a voltage is applied across said winding having an effective magnitude less than a second selected value for changing said contacts to the other one of said states, a temperature sensing device comprising a resistor having a high temperature coefficient of resistance disposed in heat transfer relation with the body, means independent of the heater and including said electrical contacts and effective when said electrical contacts are in one of said states for applying across said winding a voltage having a first effective magnitude and effective in response to a change of said electrical contacts from one to the other of said states and independently of any change of the temperature sensed by said temperature sensing device to change the effective magnitude of the voltage applied across said winding to a second and different effective magnitude, and means including said temperature sensing device for varying at least one of said first and second effective magnitudes in accordance with the temperature sensed by said temperature sensing device.

2. The combination of claim 1 in which said selected values are the same.

3. The combination of claim 1 further including means for establishing a difference between said selected values.

4. The combination of claim 1 in which said first magnitude is greater than said first selected value and in which said second magnitude is less than said second selected value so that said contacts repetitively open and close even though the sensed temperature remains constant.

5. In a system for association with a source of energy for controlling a heater in accordance with the sensed temperature of a body, the combination of a pair of matable electrical contacts having opened and closed states, means including said contacts for controlling the heater, actuating means including a winding effective when a voltage is applied across said winding having an effective magnitude greater than a first selected value for changing said contacts to one of said states and effective when a voltage is applied across said winding having an effective magnitude less than a second selected value for changing said contacts to the other one of said states, a temperature sensing device comprising a resistor having a high temperature coefficient of resistance disposed in heat transfer relation with the body, means independent of the heater and including said electrical contacts and effective when said electrical contacts are in one of said states for applying across said winding a voltage having a first finite effective magnitude and effective in response to a change of said electrical contacts from one to the other of said states and independently of any change of the temperature sensed by said temperature sensing device to change the effective magnitude of the voltage applied across said winding to a second and different finite effective magnitude, and means including said temperature sensing device for varying both of said first and second effective magnitudes in accordance with the temperature sensed by said temperature sensing device.

6. In a system for association with a source of energy for controlling a heater in accordance with the sensed temperature of a body, the combination of a pair of matable electrical contacts having opened and closed states, means including said contacts for controlling the heater, actuating means including a winding effective a delay interval after a voltage is applied across said winding having an effective magnitude greater than a first selected value for changing said contacts to one of said states and effective a delay interval after a voltage is applied across said winding having an effective magnitude less than a second selected value for changing said contacts to the other one of said states, a temperature sensing device comprising a resistor having a high temperature coefficient of resistance disposed in heat transfer relation with the body, means independent of the heater and including said electrical contacts and effective when said electrical contacts are in one of said states for applying across said winding a voltage having a first effective magnitude and effective in response to a change of said electrical contacts from one to the other of said states and independently of any change of the temperature sensed by said temperature sensing device to change the effective magnitude of the voltage applied across said winding to a second and different effective magnitude, and means including said temperature sensing device for varying at least one of said first and second effective magnitudes in accordance with the temperature sensed by said temperature sensing device.

7. The combination of claim 6 in which the duration of one of said delay intervals is controlled by the magnitude of the voltage which is applied across said winding during said interval.

8. The combination of claim 6 in which the duration of both of said delay intervals is controlled by the magnitude of the voltages which are applied across said winding during the respective intervals.

9. The combination of claim 7 in which the magnitude of the voltage which is applied across said winding during said interval is controlled by said temperature sensing device.

10. The combination of claim 8 in which the magnitudes of both of the voltages which are applied across said winding during said intervals are controlled by said temperature sensing device.

11. In a system for association with a source of energy for controlling a heater in accordance with the sensed temperature of a body, the combination of a pair of matable electrical contacts having opened and closed states, means including said contacts for controlling the heater, actuating means including a winding effective when a voltage is applied across said winding having an effective magnitude greater than a first selected value for changing said contacts to a first one of said states and effective when a voltage is applied across said winding having an effective magnitude less than a second selected value for changing said contacts to a second one of said states, a temperature sensing device comprising a resistor having a high temperature coefficient of resistance disposed in heat transfer relation with the body, means including said temperature sensing device connected to the source for applying a voltage across said winding the effective magnitude of which is varied by said temperature sensing device in accordance with the sensed temperature, and means including said electrical contacts and time delay means and effective in response to and a delay period after each change of said contacts from one to another of said states and independently of any change of the temperature sensed by said temperature sensing device for changing the effective magnitude of said voltage applied across said winding.

12. In a system for association with a source of energy for controlling a heater in accordance with the sensed temperature of a body, the combination of a pair of matable electrical contacts having opened and closed states, means including said contacts for controlling the heater, actuating means including a winding effective a delay interval after a voltage is applied across said winding having an effective magnitude greater than a first selected value for changing said contacts to a first one of said states and effective a delay interval after a voltage is applied across said winding having an effective magnitude less than a second selected value for changing said contacts to a second one of said states, a temperature sensing device comprising a resistor having a high temperature coefficient of resistance disposed in heat transfer relation with the body, means including said temperature sensing device connected to the source for applying a voltage across said winding the effective magnitude of which is varied by said temperature sensing device in accordance with the sensed temperature, and means including said electrical contacts and time delay means and effective in response to and a delay period after each change of said contacts from one to another of said states and independently of any change of the temperature sensed by said temperature sensing device for changing the magnitude of said voltage applied across said winding.

13. The combination of claim 12 further including means for controlling the duration of one of said delay intervals in accordance with the magnitude of the voltage which is applied across said winding during said interval.

14. The combination of claim 12 further including means for controlling the duration of both of said delay intervals in accordance with the magnitude of the voltages which are applied across said winding during the respective intervals.

15. In a system for association with a source of varying voltage for controlling a heater in accordance with the sensed temperature of a body, the combination of a pair of matable electrical contacts having opened and closed states, means including said contacts for controlling the heater actuating means including a winding effective when a voltage is applied across said winding having an effective magnitude greater than a first selected value for changing said contacts to one of said states and effective wherein a voltage is applied across said winding having an effective magnitude less than a second selected value for changing said contacts to the other one of said states, a temperature sensing device comprising a resistor having a high temperature coefficient of resistance disposed in heat transfer relation with the body, means including said temperature sensing device connected to the source for applying a voltage across said winding which repetitively varies between first and second finite effective magnitudes one of which varies in accordance with the sensed temperature, and means including voltage regulating means for rendering only one of said first and second finite effective magnitudes insensitive to the variations in the voltage of the source, the other one of said first and second finite effective magnitudes varying with variations in the voltage of the source.

16. In a system for association with a source of energy of varying voltage for controlling a heater in accordance with the sensed temperature of a body, the combination of a pair of matable electrical contacts having opened and closed states, means including said contacts for controlling the heater, actuating means including a winding effective when a voltage is applied across said winding having an effective magnitude greater than a first selected value for changing said contacts to one of said states and effective when a voltage is applied across said winding having an effective magnitude less than a second selected value for changing said contacts to the other one of said states, a temperature sensing device comprising a resistor having a high temperature coefficient of resistance disposed in heat transfer relation with the body, means including self-interrupting voltage regulating means and said temperature sensing device connected to the source for applying a voltage across said winding which repetitively varies between first and second effective magnitudes, both of which vary in accordance with the sensed temperature, and means including said voltage regulating means for rendering only one of said first and second effective magnitudes insensitive to the variations in the voltage of the source, the other one of said first and second effective magnitudes varying with variations in the voltage of the source.

17. The method of compensating for supply voltage variations in a temperature controlling system including a temperature senser and an electroresponsive controller which repetitively energizes and deenergizes an electric resistance type heater which comprises varying the duration of the periods of energization of the heater in accordance with the variations of the supply voltage and in accordance with the sensed temperature and varying the duration of the periods of deenergization of the heater solely in accordance with sensed temperature and independently of supply voltage variations.

18. The method of compensating for supply voltage variations in a temperature controlling system including a temperature senser and an electroresponsive controller which repetitively energizes and deenergizes an electric resistance type heater which comprises varying the duration of the periods of energization of the heater as a function of the square of the variations of the supply voltage and in accordance with the sensed temperature and varying the duration of the periods of deenergization of the heater solely in accordance with sensed temperature and independently of supply voltage variations.

19. In combination with a source of energy, an electrical resistance type heater and a body of varying temperature, a self-interrupting thermal relay having a pair of electrical contacts and a first heater winding and connected to the source for producing an output voltage, variable resistance temperature sensing means in heat transfer relation with the body for modifying the output voltage in accordance with the sensed temperature of the body, means including a responder relay having actuating means to which said output voltage is applied and responsive to said output voltage for controlling the energization and deenergization of said heater, and means including another heater winding on said self-interrupting thermal relay controlled directly by said responder relay for varying said output voltage.

20. The combination of claim 19 in which said self-interrupting thermal relay includes two polymetallic portions acting oppositely in their effect upon said electrical contacts in response to heating, in which said first heater winding is in heat transfer relation with one of said portions and in which said other heater winding is in heat transfer relation with the other one of said portions.

21. The combination of claim 20 in which the energizing circuit for said first heater winding includes said electrical contacts and in which the energizing circuit for said other heater winding does not include said electrical contacts.

22. In combination with a source of energy, an electrical resistance type heater and a body of varying temperature, a self-interrupting thermal relay having a pair of electrical contacts and a first heater winding and connected to the source for producing an output voltage, variable resistance temperature sensing means in heat transfer relation with the body for modifying the output voltage in accordance with the sensed temperature of the body, means including a two-condition responder relay having actuating means to which said output voltage is applied and responsive to said output voltage for controlling the energization and deenergization of said heater, and means including another heater winding on said self-interrupting thermal relay controlled by said responder relay for varying said output voltage by an amount greater than that required to produce a change of condition of said responder relay.

23. In combination with a source of energy, an electrical resistance type heater and a body of varying temperature, a self-interrupting thermal relay having a pair of electrical contacts and a first heater winding and connected to the source for producing an output voltage, variable resistance temperature sensing means in heat transfer relation with the body for modifying the output voltage in accordance with the sensed temperature of the body, means including a responder relay having an energizing winding responsive to said output voltage for controlling the energization and deenergization of said heater, means including another heater winding on said self-interrupting thermal relay controlled by said responder relay for varying said output voltage, and means for adjusting the average energization of said heater while maintaining the average power supplied to said responder relay independent of said adjustment comprising a plurality of resistors and means for selectively interconnecting said resistors in circuit with said energizing winding.

24. In combination with a source of energy, an electrical resistance type heater and a body of varying temperature, a self-interrupting thermal relay having a pair of electrical contacts and a first heater winding and connected to the source for producing an output voltage, variable resistance temperature sensing means comprising a casing, a first temperature responsive resistor supported at the end of said casing and in intimate heat transfer relation with the container and subject to direct heating by the heater, a second temperature responsive resistor disposed within said casing and subject to substantially the same direct heating by the heater as said first resistor, and connecting means connecting said resistors in circuit with one another and with said thermal relay for modifying said output voltage, means including a responder relay responsive to said output voltage for controlling the energization and deenergization of said heater, and means including another heater winding on said self-interrupting thermal relay controlled by said responder relay for varying said output voltage.

25. In a system for association with a source of energy of varying voltage for controlling a heater in accordance with the sensed temperature of a body, the combination of a casing having two side walls, a voltage responsive controller relay comprising a pair of matable electrical contacts having opened and closed states, a generally U-shaped polymetallic element including an anchored leg and a leg carrying one of said pair of matable electrical contacts, and means including said polymetallic element and a heater winding disposed in heat transfer relation therewith effective when a voltage is applied across said winding having an effective magnitude greater than the first selected value for changing said contacts to one of said states and effective when a voltage is applied across said winding having an effective magnitude less than a second selected value for changing said contacts to the other one of said states, means including said contacts for controlling the heater, a temperature sensing device comprising a resistor having a high temperature coefficient of resistance disposed in heat transfer relation with the body, voltage regulating means, means including said temperature sensing device and said voltage regulating means connected to the source for applying a voltage across said winding which repetitively varries between first and second finite effective magnitudes one of which varies in accordance with the sensed temperature, means including said voltage regulating means for rendering only one of said first and second magnitudes insensitive to the variations in the voltage of the source, the other one of said first and second magnitudes varying with variations in the voltage of the source, said voltage regulating means comprising a relay having a generally U-shaped polymetallic element including an anchored leg and an electrical contact carrying leg, means for mounting one of said relays with one of its legs adjacent one of said walls, and means for mounting the other one of said relays with the corresponding one of its legs adjacent the other one of said walls.

26. In a system for association with a source of energy for controlling a heater in accordance with the sensed temperature of a body, the combination of a pair of matable electrical contacts having opened and closed states, means including said contacts for controlling the heater, actuating means including a winding effective when a voltage is applied across said winding having an effective magnitude greater than a first selected value for changing said contacts to one of said states and effective when a voltage is applied across said winding having an effective magnitude less than a second selected value for changing said contacts to the other one of said states, a temperature sensing device comprising a resistor having a high temperature coefficient of resistance disposed in heat transfer relation with the body, and means including said temperature sensing device connected to the source for applying a series of relatively higher frequency voltage pulses across said winding having an average value which repetitively varies independently of any change of temperature sensed by said temperature sensing device at a relatively lower frequency between first and second effective magnitudes at least one of which is controlled by said temperature sensing device and varies in accordance with the sensed temperature.

27. The combination of claim 26 in which said first effective magnitude is greater than said selected value and in which said second effective magnitude is less than said selected value so that said contacts repetitively open and close even though the sensed temperature remains constant.

28. In a system for association with a source of energy for controlling a heater in accordance with the sensed temperature of a body, the combination of a pair of matable electrical contacts having opened and closed states, means including said contacts for controlling the heater, actuating means including a winding effective when a voltage is applied across said winding having an effective magnitude greater than a first selected value for changing said contacts to one of said states and effective when a voltage is applied across said winding having an effective magnitude less than a second selected value for changing said contacts to the other one of said states, a temperature sensing device comprising a resistor having a high temperature coefficient of resistance disposed in heat transfer relation with the body, and means including said temperature sensing device connected to the source for applying a series of relatively higher frequency voltage pulses across said winding having an average value which repetitively varies independently of any change of the temperature sensed by said temperature sensing device at a relatively lower frequency between first and second effective magnitudes both of which are controlled by said temperature sensing device and vary in accordance with the sensed temperature.

29. In a system for association with a source of electrical energy for controlling a heater in heat transfer relation with a body to be heated, the combination of an electro-thermal self-interrupting device including a pair of electrical contacts having open and closed states, a polymetallic element controlling said contacts and heating means for said element; an electro-thermal relay including electrical contact means for controlling the heater, said electrical contact means having open and closed states, a polymetallic element for controlling said contact means, and heater means for controlling said polymetallic element of said relay; a senser having a high temperature coefficient of resistance disposed in heat transfer relation with the body; circuit means for connecting said senser, said heating means and said heater means to the source of energy through said electrical contacts, and means for causing said electro-thermal relay to repetitively open and close said electrical contact means even in the absence of a change of the temperature of the body comprising additional heating means for said polymetallic element of said self-interrupting device, and circuit means for connecting said additional heating means in circuit with said electrical contact means for causing said additional heating means to be energized whenever said electrical contact means are in one state and deenergized whenever said electrical contact means are in the other state, energization of said additional heating means causing said self-interrupting device to cause said electro-thermal relay to change said electrical contact means to said other state, and deenergization of said additional heating means causing said self-interrupting device to cause said electro-thermal relay to change said electrical contact means to said one state.

30. The combination of claim 29 in which said additional heating means is effective when energized to tend to cause said pair of electrical contacts to be closed, in which the closure of said electrical contacts tends to cause said electro-thermal relay to open said electrical contact means, and in which opening of said electrical contact means deenergizes said additional heating means.

31. In a temperature controlling system for controlling the temperature of a mass being heated by a heater, a first temperature responsive resistor having a high temperature coefficient of resistance disposed in intimate heat transfer relation with the mass and in poorer heat transfer relation with the heater, means including a control circuit and said first resistor for controlling the energization of the heater and effective when said first resistor reaches a selectable temperature for reducing the energization of the heater, and a second temperature responsive resistor having a high temperature coefficient of resistance opposite to the coefficient of resistance of said first resistor and disposed in poor heat transfer relation with the mass and in substantially the same heat transfer relation with the heater as said first resistor, said second resistor being included in and modifying the current in said control circuit in accordance with its resistance and being connected in parallel with said first resistor in said control circuit, and means including said second resistor in said control circuit for delaying said reduction for the energization of the heater in accordance with the elevation of the temperature of said second resistor resulting from the heating of said heater.

References Cited in the file of this patent

UNITED STATES PATENTS

| | | |
|---|---|---|
| 2,216,748 | Lindemann | Oct. 8, 1940 |
| 2,278,633 | Bagnall | Apr. 7, 1942 |
| 2,602,132 | Young | July 1, 1952 |
| 2,727,973 | Collins | Dec. 20, 1955 |
| 2,757,256 | Cataldo et al. | July 31, 1956 |
| 2,767,296 | Welch | Oct. 16, 1956 |
| 2,819,371 | Aldrich et al. | Jan. 7, 1958 |
| 2,830,164 | Weber et al. | Apr. 8, 1958 |
| 2,833,889 | Boddy | May 6, 1958 |
| 2,841,671 | Marquis | July 1, 1958 |
| 2,846,556 | Whinery | Aug. 5, 1958 |
| 2,910,569 | Boddy | Oct. 27, 1959 |